US012762849B2

(12) United States Patent
Tsutaoka

(10) Patent No.: US 12,762,849 B2
(45) Date of Patent: Oct. 13, 2026

(54) TRAINING DATA CREATION APPARATUS, METHOD, AND PROGRAM, MACHINE LEARNING APPARATUS AND METHOD, LEARNING MODEL, AND IMAGE PROCESSING APPARATUS

(71) Applicant: FUJIFILM Corporation, Tokyo (JP)

(72) Inventor: Takuya Tsutaoka, Tokyo (JP)

(73) Assignee: FUJIFILM CORPORATION, Tokyo (JP)

( * ) Notice: Subject to any disclaimer, the term of this patent is extended or adjusted under 35 U.S.C. 154(b) by 694 days.

(21) Appl. No.: 18/179,329

(22) Filed: Mar. 6, 2023

(65) Prior Publication Data

US 2023/0206609 A1 Jun. 29, 2023

Related U.S. Application Data

(63) Continuation of application No. PCT/JP2021/030534, filed on Aug. 20, 2021.

(30) Foreign Application Priority Data

Sep. 7, 2020 (JP) ................................ 2020-149585

(51) Int. Cl.
*G06T 7/00* (2017.01)
*G06T 7/11* (2017.01)
(Continued)

(52) U.S. Cl.
CPC ........ *G06V 10/7747* (2022.01); *G06T 7/0012* (2013.01); *G06T 7/11* (2017.01);
(Continued)

(58) Field of Classification Search
CPC .... G06V 10/7747; G06V 10/25; G06V 10/82; G06V 2201/03; G06T 7/0012;
(Continued)

(56) References Cited

U.S. PATENT DOCUMENTS

2018/0341872 A1* 11/2018 Wang ..................... G06V 10/82
2019/0266418 A1* 8/2019 Xu ......................... G06V 10/44
(Continued)

FOREIGN PATENT DOCUMENTS

JP 2011192178 9/2011
WO 2019217562 11/2019
(Continued)

OTHER PUBLICATIONS

"Office Action of Japan Counterpart Application", issued on Jan. 26, 2024, with English translation thereof, p. 1-p. 8.
(Continued)

*Primary Examiner* — Van D Huynh
(74) *Attorney, Agent, or Firm* — JCIPRNET

(57) ABSTRACT

A training data creation apparatus, method, and program that can create training data for training a region extractor with the expected performance in a situation in which a plurality of ground-truth region masks have been assigned to a single image, a machine learning apparatus and method, a learning model, and an image processing apparatus are provided. A training data creation apparatus includes a first processor, in which a training sample acquisition unit of first processor acquires a single image and a plurality of first ground-truth region masks for the single image from a database as a single training sample. A ground-truth region mask combination unit generates a single second ground-truth region mask from the first ground-truth region masks included in the training sample. An output unit outputs, as training data, the pair of the single image included in the training sample and the combined second ground-truth region mask.

17 Claims, 10 Drawing Sheets

(51) Int. Cl.
*G06V 10/25* (2022.01)
*G06V 10/774* (2022.01)

(52) U.S. Cl.
CPC .... *G06V 10/25* (2022.01); *G06T 2207/20081* (2013.01); *G06T 2207/20084* (2013.01); *G06T 2207/30024* (2013.01)

(58) Field of Classification Search
CPC ............ G06T 7/11; G06T 2207/20081; G06T 2207/20084; G06T 2207/30024; G06T 2207/10068; G06T 2207/30096; A61B 1/000094; A61B 1/000096
See application file for complete search history.

(56) References Cited

U.S. PATENT DOCUMENTS

| | | | | |
|---|---|---|---|---|
| 2019/0311202 | A1* | 10/2019 | Lee | G06T 9/002 |
| 2019/0332118 | A1* | 10/2019 | Wang | G06T 7/11 |
| 2020/0167929 | A1* | 5/2020 | Wang | G06T 7/194 |
| 2020/0250436 | A1* | 8/2020 | Lee | G06V 10/82 |
| 2021/0063520 | A1* | 3/2021 | Chen | G01R 33/5608 |
| 2021/0248408 | A1* | 8/2021 | Deng | G06T 7/13 |
| 2021/0272284 | A1 | 9/2021 | Kamiyama | |
| 2021/0272288 | A1 | 9/2021 | Takahashi et al. | |
| 2022/0044366 | A1* | 2/2022 | Zhang | G06N 3/08 |
| 2023/0360181 | A1* | 11/2023 | Kanazawa | G06N 3/08 |
| 2024/0395035 | A1* | 11/2024 | Geiss | H04N 23/80 |

FOREIGN PATENT DOCUMENTS

| | | |
|---|---|---|
| WO | 2020031243 | 2/2020 |
| WO | 2020194662 | 10/2020 |

OTHER PUBLICATIONS

"International Search Report (Form PCT/ISA/210) of PCT/JP2021/030534," mailed on Oct. 26, 2021, with English translation thereof, pp. 1-5.

"Written Opinion of the International Searching Authority (Form PCT/ISA/237) of PCT/ JP2021/030534," mailed on Oct. 26, 2021, with English translation thereof, pp. 1-10.

* cited by examiner

TRAINING DATA CREATION APPARATUS, METHOD, AND PROGRAM, MACHINE LEARNING APPARATUS AND METHOD, LEARNING MODEL, AND IMAGE PROCESSING APPARATUS

CROSS-REFERENCE TO RELATED APPLICATIONS

The present application is a Continuation of PCT International Application No. PCT/JP2021/030534 filed on Aug. 20, 2021 claiming priority under 35 U.S.C § 119(a) to Japanese Patent Application No. 2020-149585 filed on Sep. 7, 2020. Each of the above applications is hereby expressly incorporated by reference, in its entirety, into the present application.

BACKGROUND OF THE INVENTION

1. Field of the Invention

The present invention relates to a training data creation apparatus, method, and program, a machine learning apparatus and method, a learning model, and an image processing apparatus, and more particularly, relates to a technology used to create training data for appropriately training a region extractor by machine learning.

2. Description of the Related Art

When attempting to use a learning model to construct a region extractor that extracts a specific region from an image, it is typical to prepare a large number of 1:1 pairs of images and ground-truth region masks, and optimize (learn) the parameters of the region extractor such that the output of the region extractor and the ground-truth region masks are in agreement.

However, a situation is conceivable in which a plurality of ground-truth region masks are defined with respect to a single image. For example, the case in which a plurality of evaluators have assigned a region of interest, such as a lesion region, to the same image (a medical image) corresponds to the above situation.

In this case, a plurality of pairs are obtained from a single image and a plurality of ground-truth region masks, and when the pairs are used directly as training data for machine learning in the training of a region extractor, there is a problem in that inconsistent learning occurs in regions where the ground truth varies, and a region extractor with the expected performance is not obtained.

On the other hand, WO2019/217562A describes a technology in which a plurality of annotation data sets made by a plurality of annotators with respect to the same image are aggregated to acquire an aggregated annotation data set. The aggregation of the annotation data sets is performed by using confidence measures of the plurality of annotators to calculate a weighted average of the plurality of annotation data sets.

SUMMARY OF THE INVENTION

One embodiment according to the technology of the present disclosure provides a training data creation apparatus, method, and program that can create training data suitable for training a region extractor with the expected performance in a situation in which a plurality of ground-truth region masks have been assigned to a single image, a machine learning apparatus and method that train a region extractor by machine learning using the created training data, a trained learning model, and an image processing apparatus.

A first aspect of the invention is a training data creation apparatus including a first processor that creates training data for machine learning. The first processor performs: a training sample acquisition process of acquiring, as a single training sample, a single image and a plurality of first ground-truth region masks for the single image; a ground-truth region mask combination process of generating a single second ground-truth region mask from the plurality of first ground-truth region masks; and a process of outputting, as training data, a pair of the single image and the second ground-truth region mask.

In a situation in which a plurality of first ground-truth region masks have been assigned to a single image, the single image and the plurality of first ground-truth region masks are acquired as a single training sample, and the plurality of first ground-truth region masks are combined to generate a single second ground-truth region mask. Thereafter, the pair of the single image and the single combined second ground-truth region mask is outputted as training data. By combining the plurality of first ground-truth region masks assigned to a single image to generate a single second ground-truth region mask, a more reliable ground-truth region mask can be obtained.

In a training data creation apparatus according to a second aspect of the present invention, the training sample acquisition process preferably acquires, as the plurality of first ground-truth region masks for the single image, ground-truth region masks each assigned to the single image by a plurality of evaluators.

In the training data creation apparatus according to a third aspect of the present invention, the training sample acquisition process preferably inputs the single image into each of a plurality of first region extractors trained by machine learning in advance using a ground-truth region mask of each of a plurality of evaluators, and acquires, as the plurality of first ground-truth region masks for the single image, a plurality of region extraction results outputted by the plurality of first region extractors.

The first region extractor may be trained by machine learning using a ground-truth region mask assigned by a single evaluator, or may be trained by machine learning using ground-truth region masks assigned by an evaluator group adhering to some criterion (such as an organization to which the evaluators belong, for example).

In a training data creation apparatus according to a fourth aspect of the present invention, the first processor preferably performs a sample weighting calculation process of calculating a sample weighting such that the higher a degree of disagreement among the plurality of first ground-truth region masks is, the smaller the sample weighting of the training sample during machine learning is, and outputs, as training data, the pair of the single image and the second ground-truth region mask together with the calculated sample weighting.

It is conceivable that the higher the degree of disagreement among the plurality of first ground-truth region masks is, the less reliable the second ground-truth region mask obtained by combining the plurality of first ground-truth region masks will be compared to a ground-truth region mask generated from a plurality of first ground-truth region masks having a low degree of disagreement (high degree of agreement), and therefore the sample weighting is reduced to lower the contribution to the machine learning.

In a training data creation apparatus according to a fifth aspect of the present invention, the sample weighting preferably is a value in the range from 0 to 1, and the sample weighting calculation process preferably calculates, as the sample weighting, the value obtained by subtracting the proportion of pixels in disagreement among the plurality of first ground-truth region masks from 1. With this arrangement, the greater the proportion of pixels in disagreement among the plurality of first ground-truth region masks is, the more the sample weighting can be reduced.

In a training data creation apparatus according to a sixth aspect of the present invention, the training sample acquisition process preferably further acquires diagnostic information for biological tissue, and the ground-truth region mask combination process preferably generates the second ground-truth region mask using the first ground-truth region masks matching the diagnostic information from among the plurality of first ground-truth region masks.

The diagnostic information for biological tissue includes a diagnostic result for the biological tissue and the coordinate position in the image from which the biological tissue was sampled. The first ground-truth region masks matching the diagnostic information refer to ground-truth region masks which are in agreement with the diagnostic result and which include the coordinate position of the sampled tissue. With this arrangement, the first ground-truth region masks that do not match the diagnostic result can be excluded.

In a training data creation apparatus according to a seventh aspect of the present invention, the ground-truth region mask combination process preferably acquires, as the second ground-truth region mask, any of: a ground-truth region mask in which a ground-truth region is a region of a common portion of the plurality of first ground-truth region masks; a ground-truth region mask in which the ground-truth region is a region of a union of the plurality of first ground-truth region masks; a ground-truth region mask in which the ground-truth region is a region containing pixels determined to be the ground truth by a majority decision for each pixel in the plurality of first ground-truth region masks; a ground-truth region mask combined by averaging the plurality of first ground-truth region masks; and a first ground-truth region mask which is selected from the plurality of first ground-truth region masks and which has the ground-truth region of maximum or minimum area.

A training data creation apparatus according to an eighth aspect of the present invention preferably includes a recording apparatus storing a training data set containing a plurality of the training data.

A training data set recorded to a recording apparatus and containing an accumulated plurality of training data can be used when machine learning is used to train a region extractor to extract a specific region from an inputted image.

In a training data creation apparatus according to a ninth aspect of the present invention, the single image preferably is a medical image and the plurality of first ground-truth region masks preferably are ground-truth region masks indicating a region of interest each assigned to the medical image by a plurality of evaluators.

A machine learning apparatus according to a 10th aspect of the present invention includes a second processor and a second region extractor. The second processor uses machine learning to train the second region extractor using the training data created by the training data creation apparatus described above.

In a machine learning apparatus according to an 11th aspect of the present invention, the second region extractor preferably is a learning model configured as a convolutional neural network.

A 12th aspect of the present invention is a trained learning model configured as the convolutional neural network, being the second region extractor trained by machine learning performed by the machine learning apparatus described above.

A 13th aspect of the present invention is an image processing apparatus including the trained learning model.

A 14th aspect of the invention is a training data creation method for creating training data for machine learning by a first processor performing processing including: a step of acquiring, as a single training sample, a single image and a plurality of first ground-truth region masks for the single image; a step of generating a single second ground-truth region mask from the plurality of first ground-truth region masks; and a step of outputting, as training data, a pair of the single image and the second ground-truth region mask.

A training data creation method according to a 15th aspect of the present invention further includes a step of calculating a sample weighting such that the higher a degree of disagreement among the plurality of first ground-truth region masks is, the smaller the sample weighting of the training sample during machine learning is. The pair of the single image and the second ground-truth region mask together with the calculated sample weighting are outputted as training data.

In a training data creation apparatus according to a 16th aspect of the present invention, the step of acquiring the training sample further includes acquiring diagnostic information for biological tissue, and the step of generating the second ground-truth region mask includes generating the second ground-truth region mask using the first ground-truth region masks matching the diagnostic information from among the plurality of first ground-truth region masks.

In a machine learning method according to a 17th aspect of the present invention, a second processor uses machine learning to train a second region extractor using the training data created according to the training data creation method described above.

An 18th aspect of the present invention is a machine learning method for training a second region extractor by a second processor using machine learning using the training data created according to the training data creation method described above. During initial training, the machine learning of the second region extractor is performed with the sample weighting included in the training data being a fixed value, and as the machine learning progresses and the sample weighting approaches an original value from the fixed value, or when the machine learning reaches a reference level, the machine learning of the second region extractor is performed with the sample weighting switched from the fixed value to the original value.

During initial training, by starting the sample weighting from a fixed value, the parameters of the second region extractor can be made to approach optimal values quickly, and by switching the sample weighting from the fixed value to the original value as the machine learning progresses and the sample weighting approaches the original value from the fixed value, or when the machine learning reaches a reference level, the parameters of the second region extractor can be trained to approach optimal values more closely, thereby obtaining a region extractor having the expected performance.

A 19th aspect of the present invention is a training data creation program causing a computer to achieve: a function of acquiring, as a single training sample, a single image and a plurality of first ground-truth region masks for the single image; a function of generating a single second ground-truth region mask from the plurality of first ground-truth region masks; and a function of outputting, as training data, a pair of the single image and the second ground-truth region mask.

According to the present invention, it is possible to create training data suitable for training a region extractor with the expected performance in a situation in which a plurality of ground-truth region masks have been assigned to a single image.

DESCRIPTION OF THE PREFERRED EMBODIMENTS

Hereinafter, preferred embodiments of a training data creation apparatus, method, and program, a machine learning apparatus and method, a learning model, and an image processing apparatus according to the present invention will be described in accordance with the attached drawings.

Training Data Creation Apparatus

First Embodiment of Training Data Creation Apparatus

Figure 1:
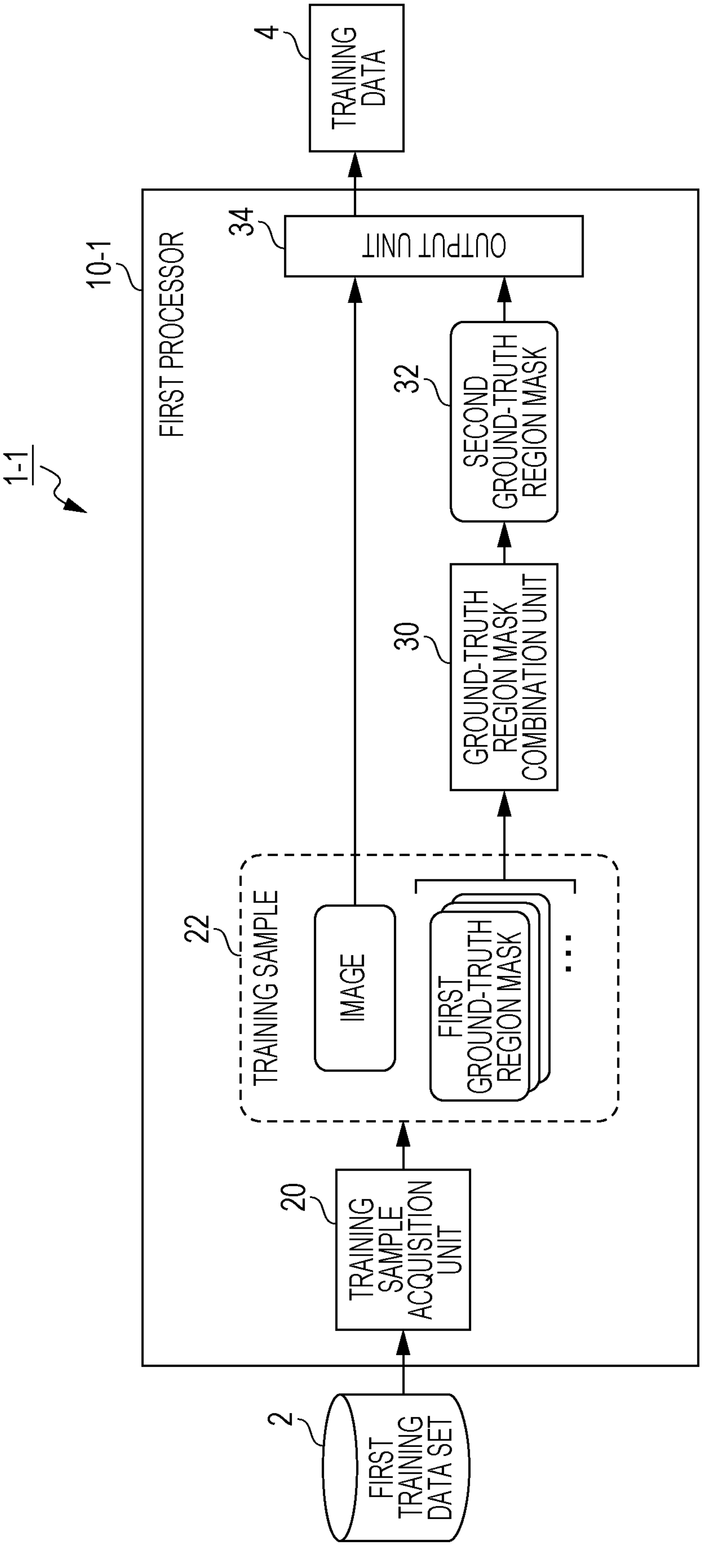
FIG. 1 is a block diagram illustrating a first embodiment of a training data creation apparatus according to the present invention.

FIG. 1 is a block diagram illustrating a first embodiment of a training data creation apparatus according to the present invention.

The training data creation apparatus 1-1 illustrated in FIG. 1 includes a first processor 10-1 including a central processing unit (CPU), a memory, and the like. The first processor 10-1 functions as a training sample acquisition unit 20, a ground-truth region mask combination unit 30, and an output unit 34.

The training sample acquisition unit 20 acquires a training sample from a database 2 that stores a first training data set.

Training Sample

Figure 2A:
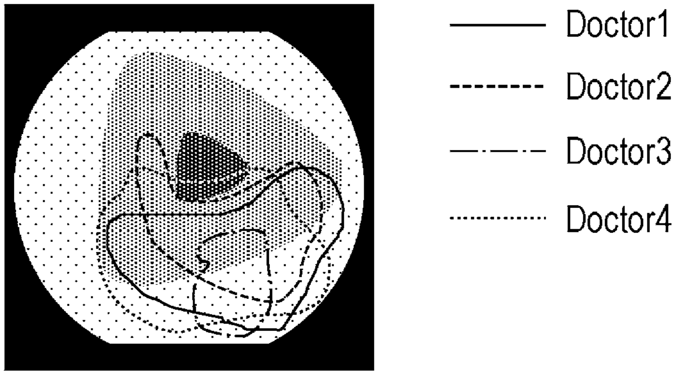
FIGS. 2A and 2B are diagrams illustrating an embodiment of a training sample.
Figure 2B:
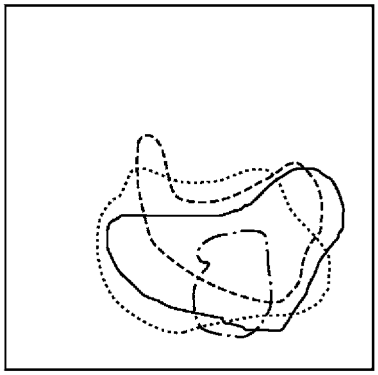

FIGS. 2A and 2B are diagrams illustrating an embodiment of a training sample.

As illustrated in FIGS. 2A and 2B, a single training sample contains a set of a single image illustrated in FIG. 2A and a plurality of ground-truth region masks (first ground-truth region masks) illustrated in FIG. 2B.

The image illustrated in FIG. 2A is a medical image picked up by an endoscope. The plurality of first ground-truth region masks illustrated in FIG. 2B are ground-truth region masks indicating regions of interest each assigned to the medical image by a plurality of evaluators (in this example, four doctors) who each interpret the same medical image.

Each doctor can create a first ground-truth region mask by using a user interface to perform an operation of surrounding a region thought to be a lesion region in the medical image with a closed curve.

As illustrated in FIGS. 2A and 2B, the plurality of first ground-truth region masks differ from one another. This is because the plurality of evaluators make different determinations.

Note that although FIG. 2B illustrates a plurality of closed curves each surrounding a region that each doctor has determined to be a lesion region, each of the first ground-truth region masks may be a binary image that takes a value of "1" in the region surrounded by the closed curve and a value of "0" elsewhere, for example.

Also, although the plurality of closed curves surrounding the region of interest are displayed on top of each other in the medical image illustrated in FIG. 2A, the image of the training sample does not include the closed curves.

As illustrated in FIGS. 2A and 2B, in some situations, a plurality of first ground-truth region masks may be assigned to a single image, and in this case, a single training sample contains a set of a single image and a plurality of first ground-truth region masks.

Returning to FIG. 1, the training sample acquisition unit 20 performs a training sample acquisition process that acquires a single image and a plurality of first ground-truth region masks for the single image from the database 2 as a single training sample 22. The single image included in the training sample 22 acquired by the training sample acquisition unit 20 is provided to the output unit 34, while the plurality of first ground-truth region masks are provided to the ground-truth region mask combination unit 30.

The ground-truth region mask combination unit 30 performs a ground-truth region mask combination process that combines the inputted plurality of first ground-truth region masks and generates a single ground-truth region mask (second ground-truth region mask) from the plurality of first ground-truth region masks.

Embodiment of Ground-Truth Region Mask Combination Process

When generating (combining) the single second ground-truth region mask from the plurality of first ground-truth region masks by the ground-truth region mask combination unit 30, a combination method like the following can be adopted.

(1) Extract the region of the common portion of the plurality of first ground-truth region masks and generate the second ground-truth region mask by treating the extracted region as the ground-truth region.

(2) Extract the region of the union of the plurality of first ground-truth region masks and generate the second ground-truth region mask by treating the extracted region as the ground-truth region.

(3) Generate the second ground-truth region mask by treating the region containing the pixels determined to be the ground truth by a majority decision for each pixel in the plurality of first ground-truth region masks as the ground-truth region. For example, if there are five first ground-truth region masks, the second ground-truth region mask is generated by treating the region where at least three of the first ground-truth region masks overlap as the ground-truth region. If there is an even number of first ground-truth region masks, the second ground-truth region mask can be generated by treating the region where at least half of the even number overlaps as the ground-truth region.

(4) Average the plurality of first ground-truth region masks to generate the combined second ground-truth region mask.

(5) Treat a first ground-truth region mask which is selected from the plurality of first ground-truth region masks and which has the ground-truth region of maximum or minimum area as the second ground-truth region mask.

A second ground-truth region mask 32 generated by the ground-truth region mask combination unit 30 as above is provided to the output unit 34.

The output unit 34 outputs, to downstream equipment, the pair of the single image included in the training sample 22 and the single second ground-truth region mask as training data 4 for machine learning.

Second Embodiment of Training Data Creation Apparatus

Figure 3:
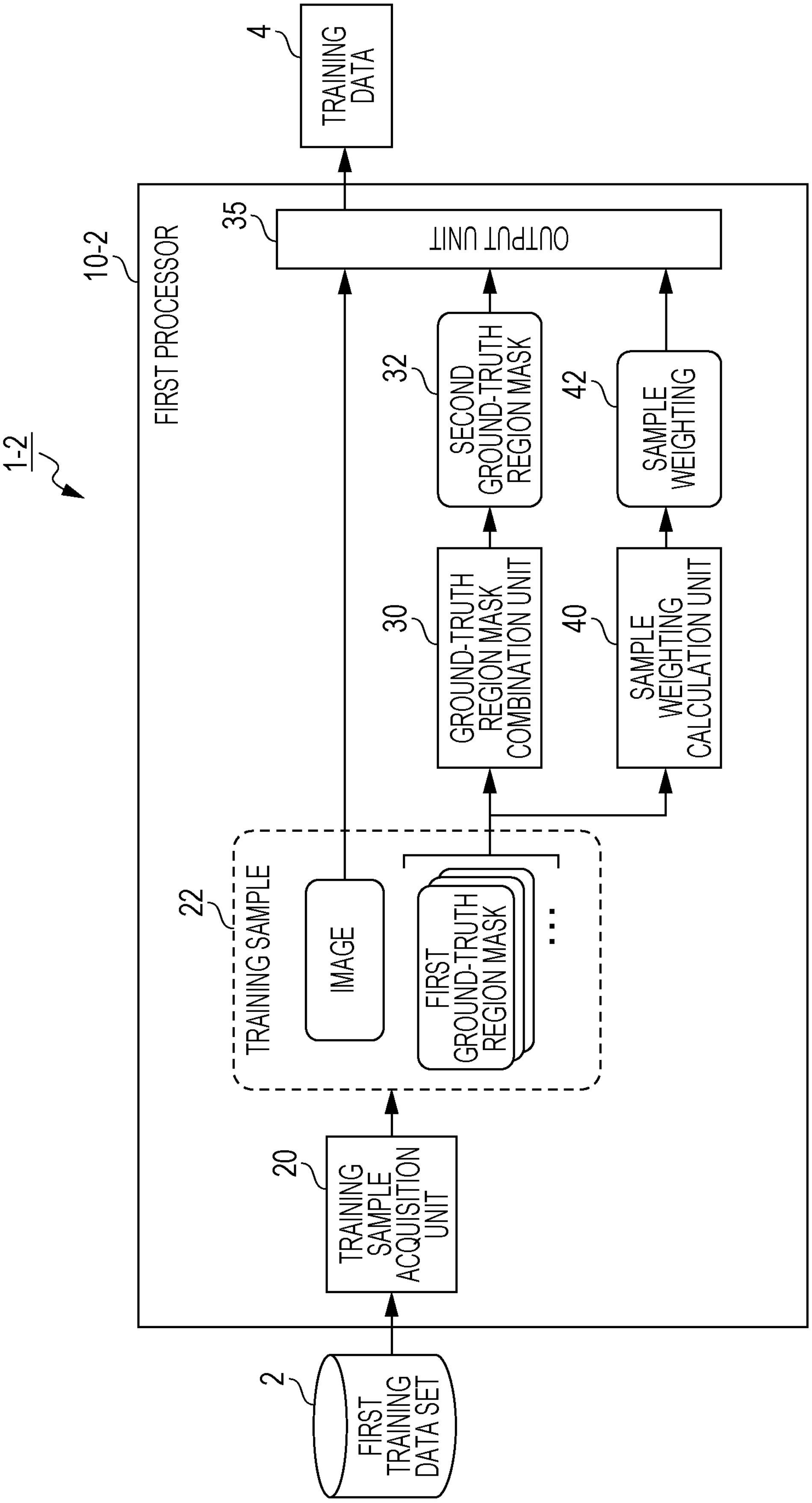
FIG. 3 is a block diagram illustrating a second embodiment of a training data creation apparatus according to the present invention.

FIG. 3 is a block diagram illustrating a second embodiment of a training data creation apparatus according to the present invention. Note that in FIG. 3, portions in common with the first embodiment illustrated in FIG. 1 are denoted with the same signs, and a detailed description of such portions is reduced or omitted.

The training data creation apparatus 1-2 illustrated in FIG. 3 includes a first processor 10-2. The first processor 10-2 functions as a training sample acquisition unit 20, a ground-truth region mask combination unit 30, a sample weighting calculation unit 40, and an output unit 35.

The sample weighting calculation unit 40 accepts a plurality of first ground-truth region masks as input and calculates a sample weighting according to the degree of agreement or disagreement among the plurality of first ground-truth region masks. The sample weighting refers to a weighting attached to the training sample (training data) to be used for training the region extractor described later by machine learning, and is a weighting that determines how much the training sample contributes to learning.

The sample weighting calculation unit 40 calculates the sample weighting such that the higher the degree of disagreement among the plurality of first ground-truth region masks is, the smaller the weighting of the training sample during machine learning is. Conversely, the sample weighting calculation unit 40 calculates the sample weighting such that the lower the degree of disagreement (the higher the degree of agreement) among the plurality of first ground-truth region masks is, the larger the calculated weighting of the sample weighting is.

The sample weighting can be taken to be a value from 0 to 1, for example, and the sample weighting calculation unit 40 can calculate, as the sample weighting, the value obtained by subtracting the proportion of pixels in disagreement among the plurality of first ground-truth region masks from 1.

With this arrangement, the greater the proportion of pixels in disagreement among the plurality of first ground-truth region masks is, the more the sample weighting can be reduced.

If there is a high degree of disagreement among the plurality of first ground-truth region masks, the determinations of the ground-truth region by the plurality of evaluators greatly differ from one another, and the degree of disagreement tends to be higher for a medical image showing, for example a lesion region for a rare case of a disease. Moreover, such a rare image is unsuitable for training a region extractor of desired performance, and therefore the sample weighting for such an image is preferably reduced.

The sample weighting 42 calculated by the sample weighting calculation unit 40 is provided to the output unit 35.

The image included in the training sample 22 and the second ground-truth region mask 32 are provided to the output unit 35, and the output unit 35 outputs, to downstream equipment, the pair of the single image and the second ground-truth region mask 32 together with the sample weighting 42 as training data 4 for machine learning.

Third Embodiment of Training Data Creation Apparatus

Figure 4:
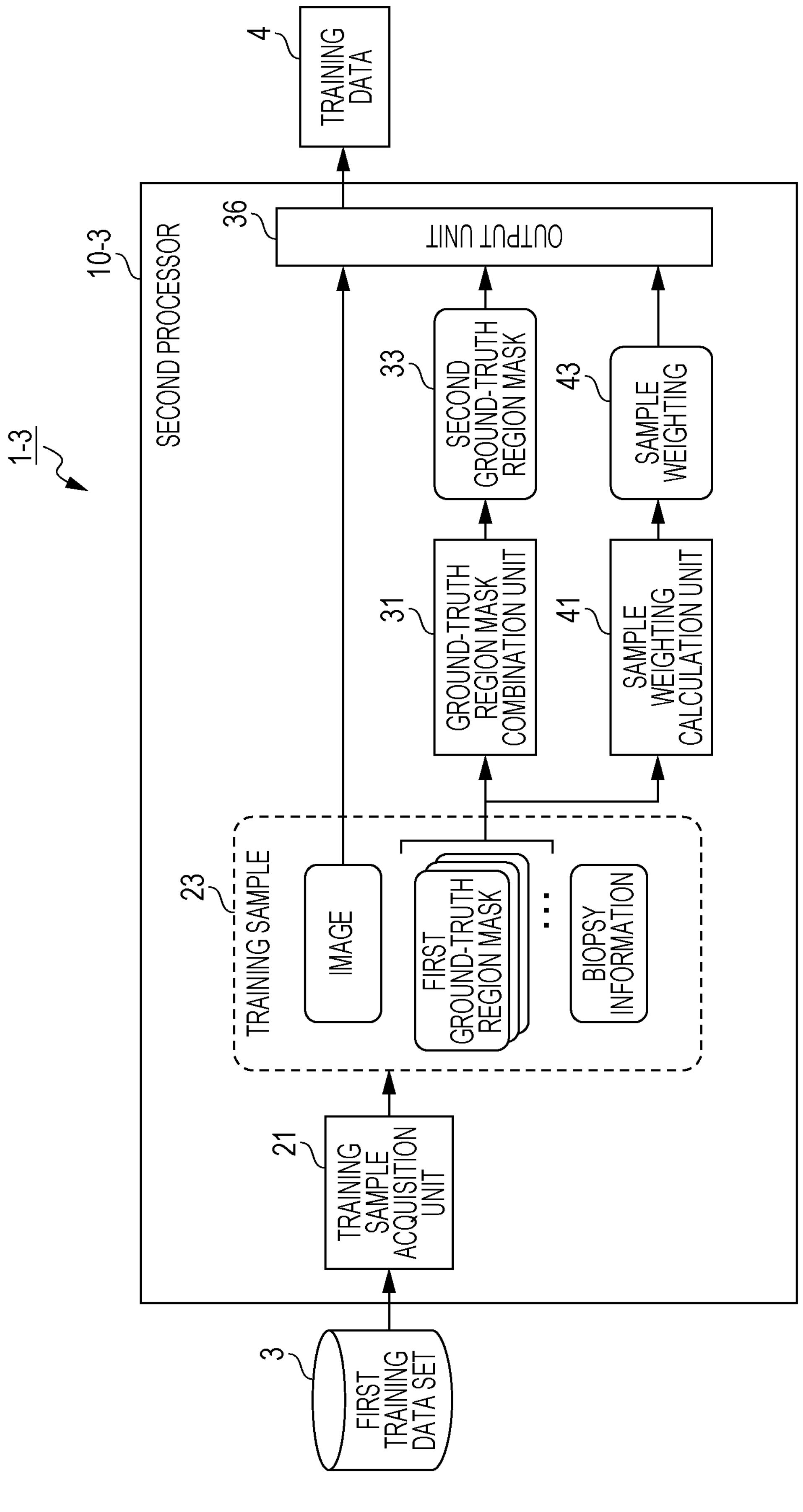
FIG. 4 is a block diagram illustrating a third embodiment of a training data creation apparatus according to the present invention.

FIG. 4 is a block diagram illustrating a third embodiment of a training data creation apparatus according to the present invention. Note that in FIG. 4, portions in common with the first embodiment illustrated in FIG. 1 and the second embodiment illustrated in FIG. 3 are denoted with the same signs, and a detailed description of such portions is reduced or omitted.

The training data creation apparatus 1-3 illustrated in FIG. 4 includes a first processor 10-3. The first processor 10-3 functions as a training sample acquisition unit 21, a ground-truth region mask combination unit 31, a sample weighting calculation unit 41, and an output unit 36.

A plurality of training samples are stored in a database 3. Each training sample includes not only a single image and a plurality of first ground-truth region masks, but also diagnostic information (biopsy information) for biological tissue.

The biopsy information has, for example, a diagnostic result for biological tissue sampled using forceps or the like and the coordinate position in the image of the sampled biological tissue.

The training sample acquisition unit 21 acquires a single training sample 23 from the database 3. The single image included in the acquired training sample 23 is provided to the output unit 36, while the plurality of first ground-truth region masks and the biopsy information are provided to each of the ground-truth region mask combination unit 31 and the sample weighting calculation unit 41.

The ground-truth region mask combination unit 31 combines the inputted plurality of first ground-truth region masks and generates a second ground-truth region mask from the plurality of first ground-truth region masks. The ground-truth region mask combination unit 31 uses the biopsy information in this case.

The ground-truth region mask combination unit 31 generate the second ground-truth region mask using the first ground-truth region masks matching the biopsy information from among the plurality of first ground-truth region masks.

If diagnostic information provided by each evaluator is attached to the plurality of first ground-truth region masks, the ground-truth region mask combination unit 31 selects, from among the plurality of first ground-truth region masks, only the first ground-truth region masks having the same diagnostic information as the diagnostic result of the biological tissue included in the biopsy information. Also, the ground-truth region mask combination unit 31 selects, from among the plurality of first ground-truth region masks, only the first ground-truth region masks with a ground-truth region that includes the coordinate position of the biological tissue included in the biopsy information.

With this arrangement, from among the plurality of first ground-truth region masks, only the first ground-truth region masks which are in agreement with the diagnostic result and which include the coordinate position of the sampled tissue can be selected, whereas the first ground-truth region masks that do not match the diagnostic result can be excluded.

The ground-truth region mask combination unit 31 generates the first ground-truth region masks selected on the basis of the biopsy information in this way as the second ground-truth region mask. The second ground-truth region mask 33 generated by the ground-truth region mask combination unit 31 is provided to the output unit 36.

Note that if a plurality of first ground-truth region masks are selected on the basis of the biopsy information, a single second ground-truth region mask is generated from the plurality of first ground-truth region masks, similarly to the first embodiment in FIG. 1. Also, in this example, from among the plurality of first ground-truth region masks, only the first ground-truth region masks which are in agreement with the diagnostic result and which include the coordinate position of the sampled tissue are selected. However, the configuration is not limited to the above, and the first ground-truth region masks in agreement with the diagnostic result may be selected, or the first ground-truth region masks that include the coordinate position of the sampled tissue may be selected.

The sample weighting calculation unit 41 calculates a sample weighting according to the degree of agreement or disagreement among the first ground-truth region masks selected on the basis of the biopsy information from among the plurality of first ground-truth region masks similarly to the ground-truth region mask combination unit 31.

The sample weighting 43 calculated by the sample weighting calculation unit 41 is provided to the output unit 36.

The image included in the training sample 23, the second ground-truth region mask 33, and the sample weighting 43 are provided to the output unit 36, and the output unit 36 outputs, to downstream equipment, the pair of the single image and the second ground-truth region mask 33 together with the sample weighting 43 as training data 4 for machine learning.

Other Embodiment of Training Sample Acquisition Unit

Figure 5:
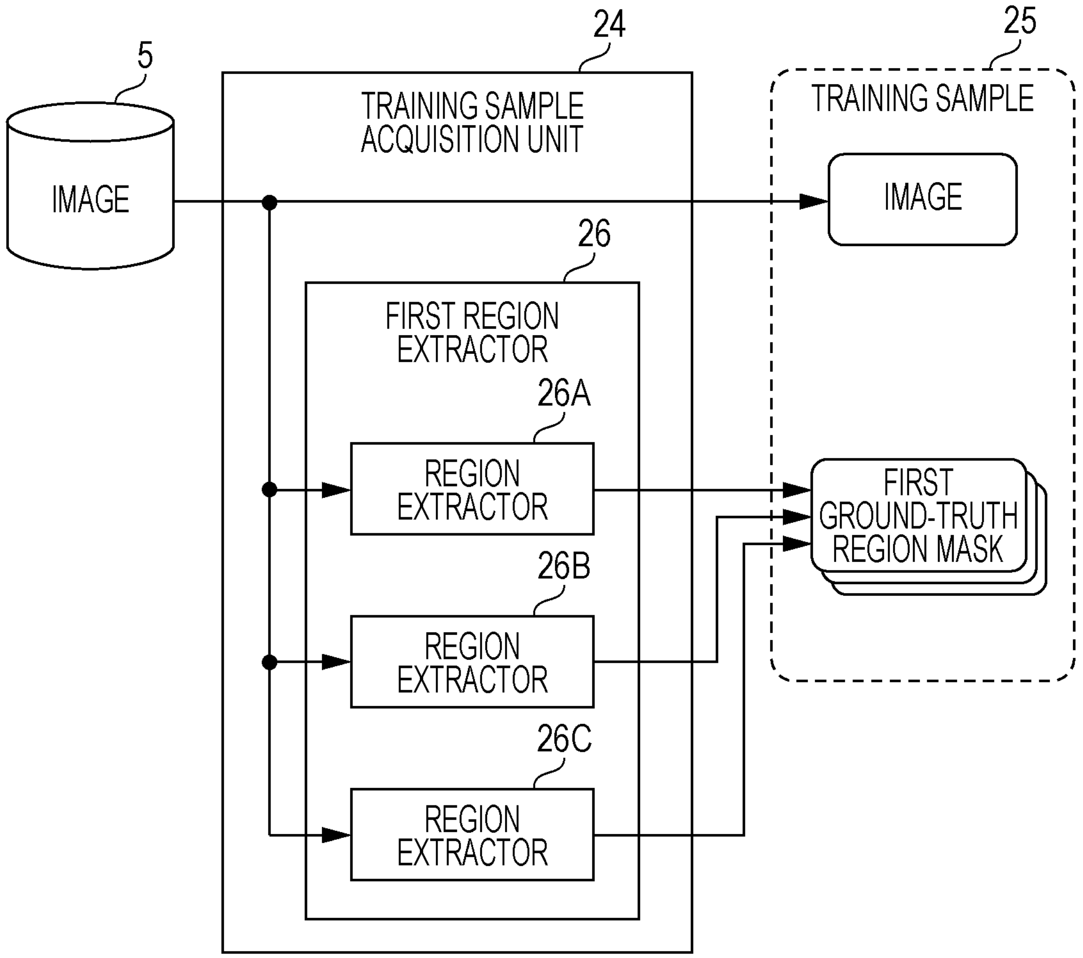
FIG. 5 is a diagram illustrating another embodiment of a training sample acquisition unit.

FIG. 5 is a diagram illustrating another embodiment of a training sample acquisition unit.

The training sample acquisition unit 24 illustrated in FIG. 5 includes a plurality of region extractors 26A, 26B, and 26C (first region extractors 26).

The plurality of region extractors 26A, 26B, and 26C are region extractors that have been trained by machine learning in advance using a training data set (a training data set including an image and a ground-truth region mask) of each of a plurality of evaluators. The plurality of region extractors 26A, 26B, and 26C may be trained by using ground-truth region masks and the like created by a single evaluator for each region extractor, or may be trained using ground-truth region masks and the like created by an evaluator group adhering to some criterion (such as an organization to which the evaluators belong, for example).

The training sample acquisition unit 24 acquires a single image from an image database 5 and treats the same image as the input image to the plurality of region extractors 26A, 26B, and 26C.

The plurality of region extractors 26A, 26B, and 26C each output, as a first ground-truth region mask, a region extraction result with respect to the input image.

The region extractors 26A, 26B, and 26C have each been trained using a training data set that differs between the evaluators, and therefore output different region extraction results (first ground-truth region masks) although the same image is given as input.

The training sample acquisition unit 24 outputs, as a training sample 25, the single image acquired from the image database 5 and the plurality of first ground-truth region masks outputted from the plurality of region extractors 26A, 26B, and 26C by treating the image as the input image.

Figure 6:
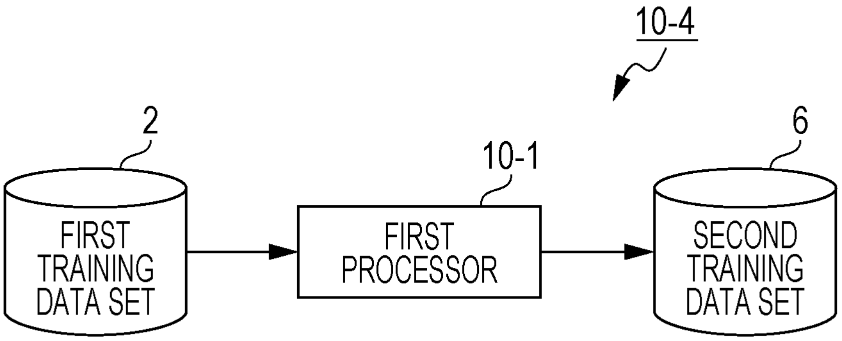
FIG. 6 is a diagram illustrating a fourth embodiment of a training data creation apparatus.

FIG. 6 is a diagram illustrating a fourth embodiment of a training data creation apparatus.

The training data creation apparatus 1-4 illustrated in FIG. 6 includes the first processor 10-1 illustrated in FIG. 1 and a recording apparatus 6.

The first processor 10-1, upon acquiring a single training sample 22 from the database 2 as described using FIG. 1, outputs a single set of training data 4 containing the pair of the single image included in the training sample 22 and a single second ground-truth region mask obtained by combining a plurality of first ground-truth region masks.

The recording apparatus 6 can be configured as a database capable of storing and managing a large volume of data, for example, and sequentially stores training data outputted from the first processor 10-1. The plurality of training data recorded and saved in the recording apparatus 6 is used as a second training data set for machine learning for training a region extractor (second region extractor) described later.

Note that the recording apparatus 6 illustrated in FIG. 6 stores training data outputted from the first processor 10-1 of the training data creation apparatus 1-1, but is not limited thereto, and may also store training data outputted from the first processors 10-2 and 10-3 of the training data creation apparatuses 1-2 and 1-3 illustrated in FIGS. 3 and 4.

Machine Learning Apparatus

Figure 7:
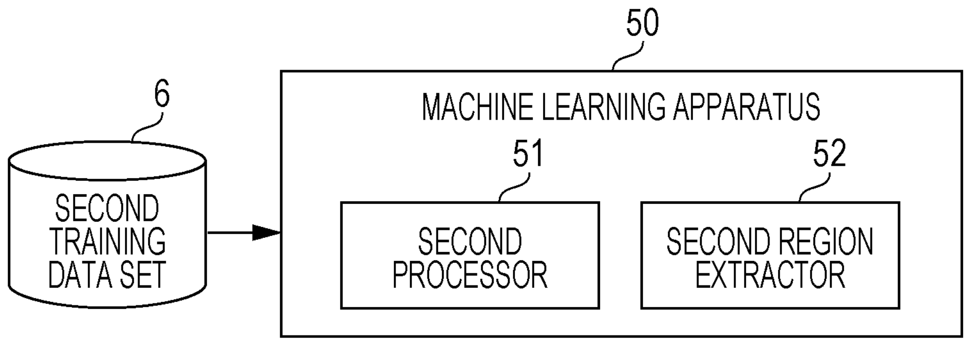
FIG. 7 is a schematic diagram of a machine learning apparatus according to the present invention.

FIG. 7 is a schematic diagram of a machine learning apparatus according to the present invention.

The machine learning apparatus 50 illustrated in FIG. 7 includes a second processor 51 and a second region extractor 52.

The second processor 51 includes a function of training the second region extractor 52 by machine learning using training data (a second training data set) stored in the recording apparatus 6 (see FIG. 6).

Figure 8:
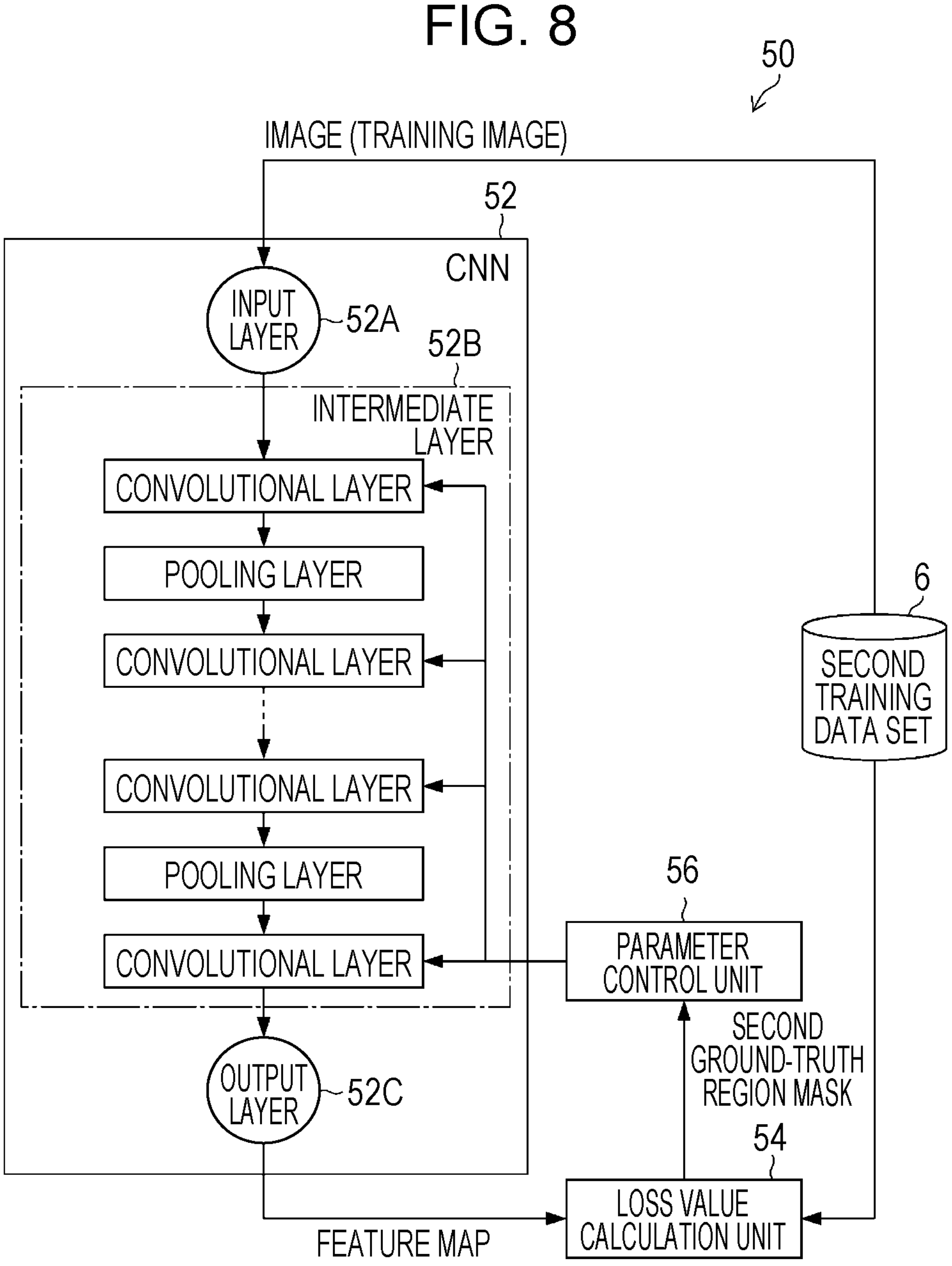
FIG. 8 is a block diagram illustrating an embodiment of the machine learning apparatus illustrated in FIG. 7.

FIG. 8 is a block diagram illustrating an embodiment of the machine learning apparatus illustrated in FIG. 7.

The second region extractor 52 of the machine learning apparatus 50 illustrated in FIG. 8 can be configured as a type of learning model called a convolutional neural network (CNN), for example.

The second processor 51 includes a loss value calculation unit 54 and a parameter control unit 56, and uses the second training data set stored in the recording apparatus 6 to train the second region extractor 52 by machine learning.

For example, the second region extractor 52 is a portion that, when a given medical image is treated as the input image, infers a region of interest such as a lesion region in the input image. The second region extractor 52 has a multi-layer structure and holds a plurality of weighting parameters. The weighting parameters are values such as the filter coefficients of a filter called a kernel which is used to perform convolutional operations in convolutional layers.

By updating the convolutional parameters from initial values to optimal values, the second region extractor 52 may change from an untrained second region extractor 52 to a trained second region extractor 52.

The second region extractor 52 includes an input layer 52A, an intermediate layer 52B having multiple sets formed from convolutional layers and pooling layers, and an output layer 52C, the layers being structured such that a plurality of "nodes" are connected by "edges".

An image (training image) to be learned is inputted as the input image into the input layer 52A. The training image is an image from training data (training data containing a pair of an image and a second ground-truth region mask) stored in the recording apparatus 6.

The intermediate layer 52B has multiple sets, with each set containing a convolutional layer and a pooling layer, and is the portion that extracts features from an image inputted from the input layer 52A. The convolutional layer applies filter processing (perform convolutional operations using a filter) on a nearby node in the previous layer, and acquires a "feature map". The pooling layer reduces the feature map outputted from the convolutional layer to generate a new feature map. The "convolutional layer" is responsible for feature extraction, such as edge extraction, from the image, while the "pooling layer" is responsible for providing robustness so that the extracted features are not affected by translations and the like.

Note that the intermediate layer 52B is not limited to the case where a single set contains a convolutional layer and a pooling layer, and may also contain consecutive convolutional layers, an activation process performed with an activation function, and a normalization layer.

The output layer 52*c* is the portion that outputs a feature map indicating the features extracted by the intermediate layer 52B. Also, in the trained second region extractor 52, the output layer 52C outputs the inference results of region classification (segmentation) of a region of interest and the like in the input image in units of pixels, or in units of clusters of several pixels, for example.

The coefficients and offset values of the filter to be applied in each convolutional layer of the untrained second region extractor 52 are set to any initial values.

Of the loss value calculation unit 54 and the parameter control unit 56 which function as a learning control unit, the loss value calculation unit 54 compares the feature map outputted from the output layer 52C of the second region extractor 52 to the second ground-truth region mask (the mask image retrieved from the recording apparatus 6 in correspondence with the image of the pair) which is ground-truth data for the input image (training image), and calculates the error (loss value, that is, the value of a loss function) between the feature map and the second ground-truth region mask. Possible methods of calculating the loss value include softmax cross-entropy and sigmoid, for example.

The parameter control unit 56 adjusts the weighting parameters of the second region extractor 52 by error backpropagation on the basis of the loss value calculated by the loss value calculation unit 54. In error backpropagation, the error is backpropagated in order from the final layer, stochastic gradient descent is performed in each layer, and the parameters are repeatedly updated until the error converges.

The machine learning apparatus 50, by repeatedly performing machine learning using the training data recorded in the recording apparatus 6, changes the second region extractor 52 into a trained second region extractor 52. The trained second region extractor 52, when given an unknown input image (for example, a captured image) as input, outputs an inference result such as a mask image indicating a region of interest within the captured image.

Figure 9:
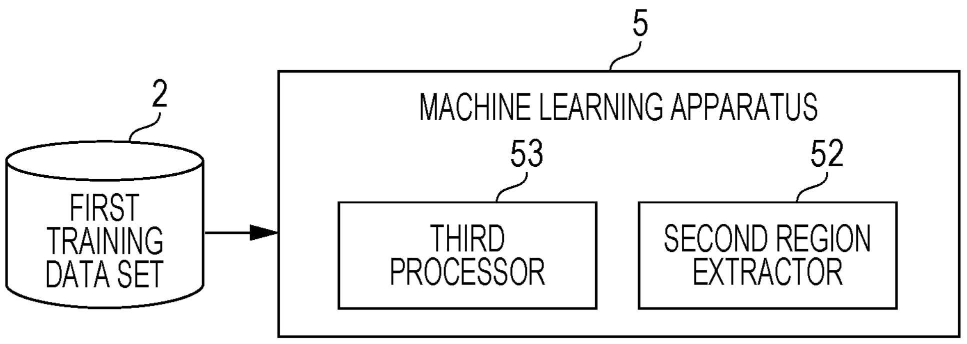
FIG. 9 is a schematic diagram illustrating another embodiment of a machine learning apparatus according to the present invention.

FIG. 9 is a schematic diagram illustrating another embodiment of a machine learning apparatus according to the present invention.

The machine learning apparatus 50-1 illustrated in FIG. 9 includes a third processor 53 and a second region extractor 52.

The third processor 53 of the machine learning apparatus 50-1 illustrated in FIG. 9 includes the functions of the first processor 10-1 illustrated in FIG. 1 and the second processor 51 illustrated in FIG. 7.

In other words, the third processor 53 functioning as the first processor 10-1, upon acquiring a single training sample from the database 2, creates training data for machine learning containing the pair of the single image included in the training sample and a single second ground-truth region mask obtained by combining a plurality of first ground-truth region masks.

In addition, the third processor 53 functioning as the second processor 51 trains the second region extractor 52 by machine learning using the created training data. Note that every time training data is created, the third processor 53 may train the second region extractor 52 using the training data. Also, every time a plurality of training data (a single batch of training data) is created, the third processor 53 may train the second region extractor 52 using the batch of training data.

Training Data Creation Method

First Embodiment of Training Data Creation Method

Figure 10:
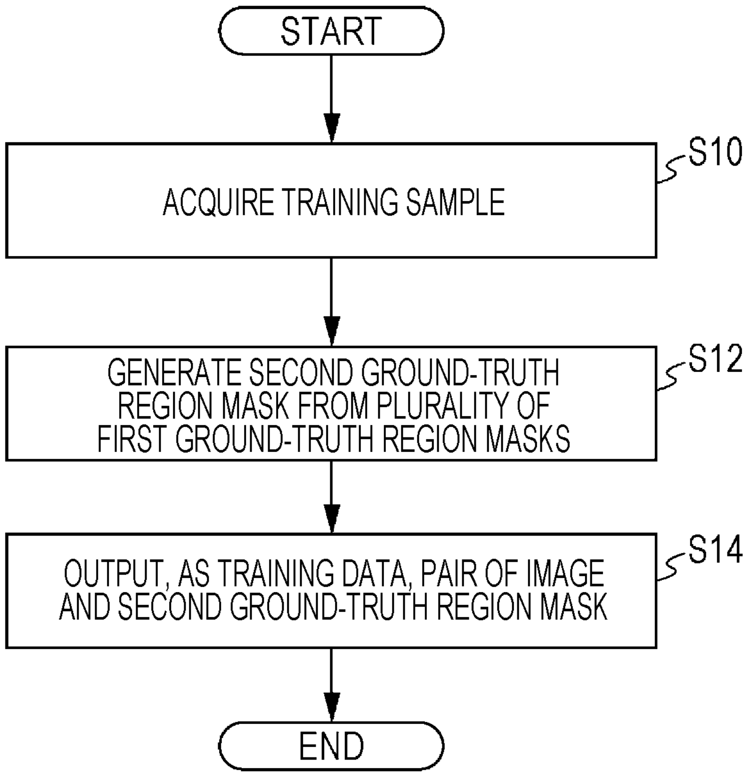
FIG. 10 is a flowchart illustrating a first embodiment of a training data creation method according to the present invention.

FIG. 10 is a flowchart illustrating a first embodiment of a training data creation method according to the present invention.

The processing in each step of the training data creation method illustrated in FIG. 10 is performed by the first processor 10-1 of the training data creation apparatus 1-1 illustrated in FIG. 1.

In FIG. 10, the training sample acquisition unit 20 acquires a single training sample 22 from the database 2 (step S10).

The ground-truth region mask combination unit 30 combines the plurality of first ground-truth region masks included in the training sample and generates a single ground-truth region mask (second ground-truth region mask) from the plurality of first ground-truth region masks (step S12). The method of generating the second ground-truth region mask can be performed according to the method of extracting the region of the common portion of the plurality of first ground-truth region masks and generating the second ground-truth region mask by treating the extracted region as the ground-truth region, the method of extracting the region of the union of the plurality of first ground-truth region masks and generating the second ground-truth region mask by treating the extracted region as the ground-truth region, the method of generating the second ground-truth region mask by treating the region containing the pixels determined to be the ground truth by a majority decision for each pixel in the plurality of first ground-truth region masks as the ground-truth region, the method of averaging the plurality of first ground-truth region masks to generate the combined second ground-truth region mask, the method of treating a first ground-truth region mask which is selected from the plurality of first ground-truth region masks and which has the ground-truth region of maximum or minimum area as the second ground-truth region mask, or the like.

The output unit 34 outputs, to a downstream output destination, the pair of the single image included in the training sample acquired in step S10 and the second ground-truth region mask generated in step S12, as training data for machine learning (step S14).

Second Embodiment of Training Data Creation Method

Figure 11:
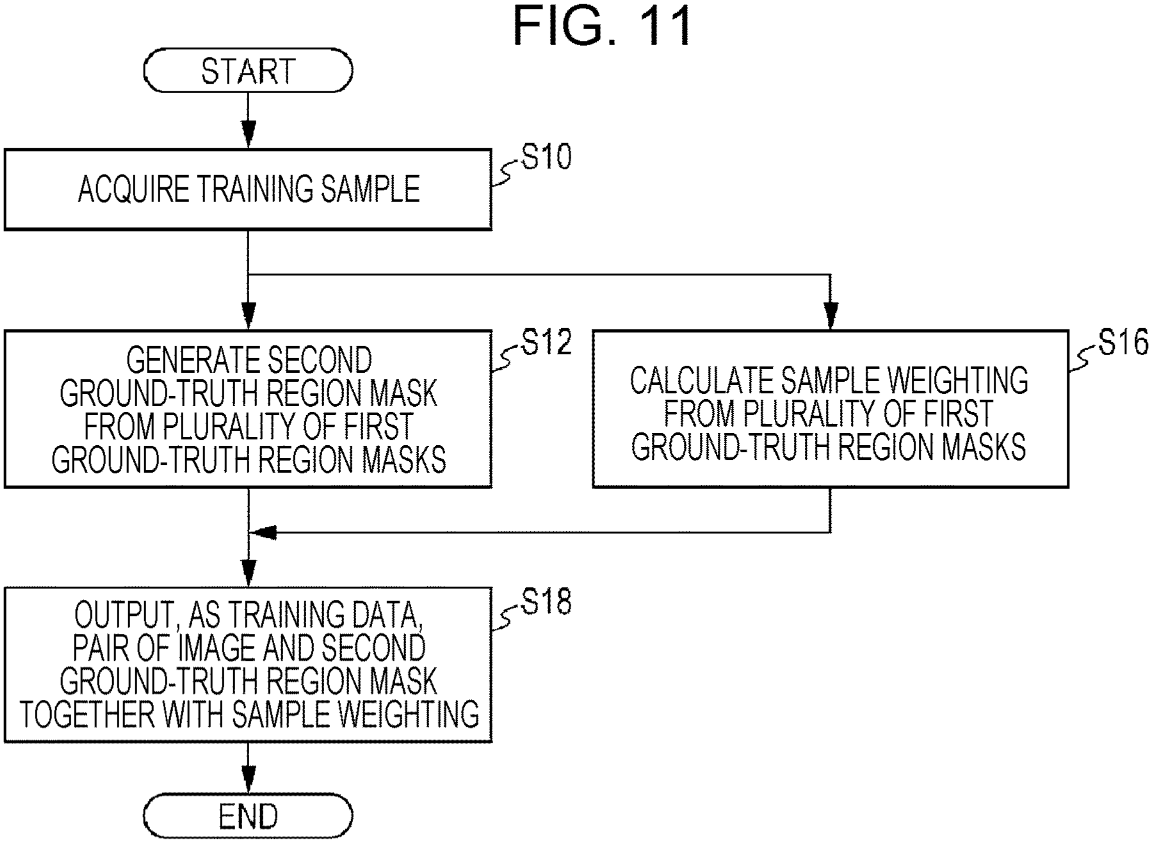
FIG. 11 is a flowchart illustrating a second embodiment of a training data creation method according to the present invention.

FIG. 11 is a flowchart illustrating a second embodiment of a training data creation method according to the present invention.

The processing in each step of the training data creation method illustrated in FIG. 11 is performed by the first processor 10-2 of the training data creation apparatus 1-2 illustrated in FIG. 3. Note that in FIG. 11, portions in common with the training data creation method of the first embodiment illustrated in FIG. 10 are denoted with the same step numbers, and a detailed description of such portions is reduced or omitted.

The training data creation method of the second embodiment illustrated in FIG. 11 differs from the training data creation method of the first embodiment illustrated in FIG. 10 mainly in the addition of processing in step S16 performed by the sample weighting calculation unit 40.

In step S16, a sample weighting according to the degree of agreement or disagreement among a plurality of first ground-truth region masks is calculated on the basis of the plurality of first ground-truth region masks. The sample weighting is a value in the range from 0 to 1, for example, and takes a smaller value for a higher degree of disagreement among the plurality of first ground-truth region masks.

The output unit 35 outputs, to downstream equipment, the pair of the single image included in the training sample acquired in step S10 and the second ground-truth region mask generated in step S12, together with the sample weighting calculated in step S16, as training data for machine learning (step S18).

Third Embodiment of Training Data Creation Method

Figure 12:
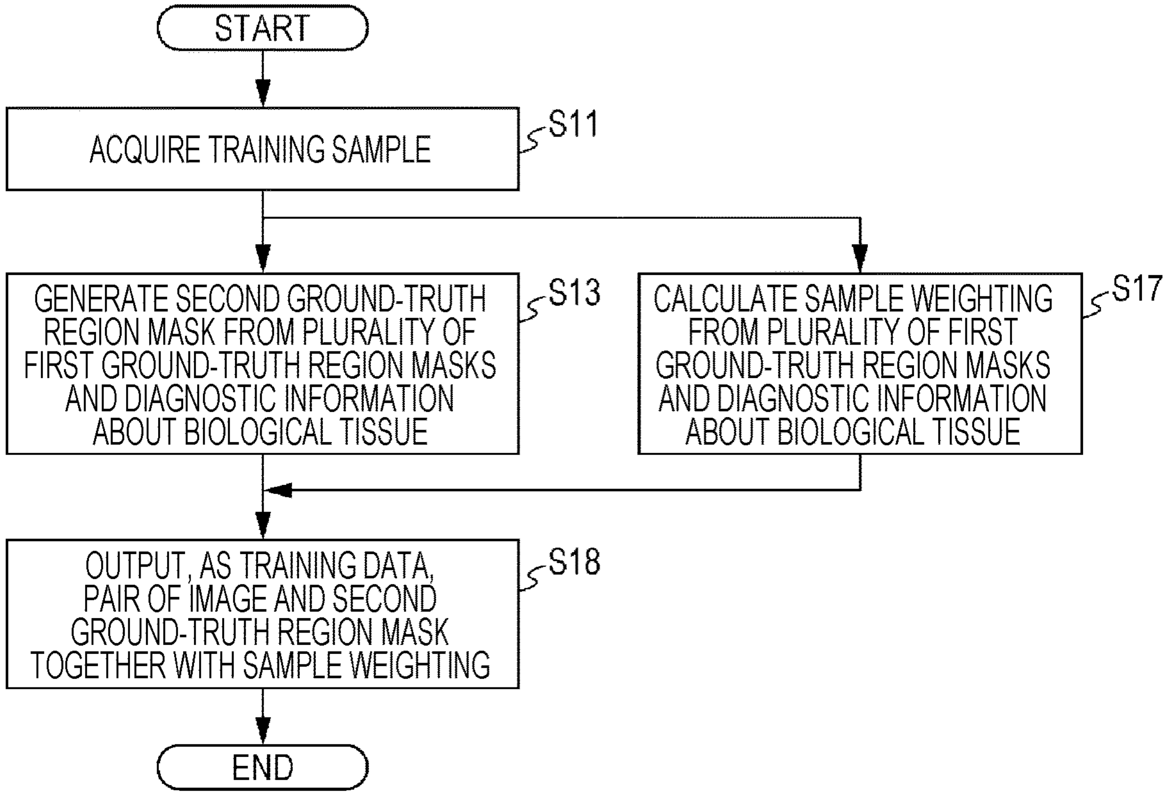
FIG. 12 is a flowchart illustrating a third embodiment of a training data creation method according to the present invention.

FIG. 12 is a flowchart illustrating a third embodiment of a training data creation method according to the present invention.

The processing in each step of the training data creation method illustrated in FIG. 12 is performed by the first processor 10-3 of the training data creation apparatus 1-3 illustrated in FIG. 4.

In step S11 of FIG. 12, a training sample is acquired from the database 3. The training sample includes not only a single image and a plurality of first ground-truth region masks, but also diagnostic information (biopsy information) for biological tissue.

If diagnostic information provided by each evaluator is attached to the plurality of first ground-truth region masks, the ground-truth region mask combination unit 31 selects only the first ground-truth region masks having the same diagnostic information as the diagnostic result of the biological tissue included in the biopsy information. Also, from among the plurality of first ground-truth region masks, only the first ground-truth region masks with a ground-truth region that includes the coordinate position of the biological tissue included in the biopsy information are selected. With this arrangement, from among the plurality of first ground-truth region masks, only the first ground-truth region masks which are in agreement with the diagnostic result and which include the coordinate position of the sampled tissue are selected. The ground-truth region mask combination unit 31 generates the first ground-truth region masks selected on the basis of the biopsy information in this way as the second ground-truth region mask (step S13).

The sample weighting calculation unit 41 calculates a sample weighting according to the degree of agreement or disagreement among the first ground-truth region masks selected on the basis of the biopsy information from among the plurality of first ground-truth region masks similarly to the ground-truth region mask combination unit 31 (step S17).

The output unit 36 outputs, to downstream equipment, the pair of the single image included in the training sample acquired in step S11 and the second ground-truth region mask generated in step S13, together with the sample weighting calculated in step S17, as training data for machine learning (step S18).

Machine Learning Method

First Embodiment of Machine Learning Method

Figure 13:
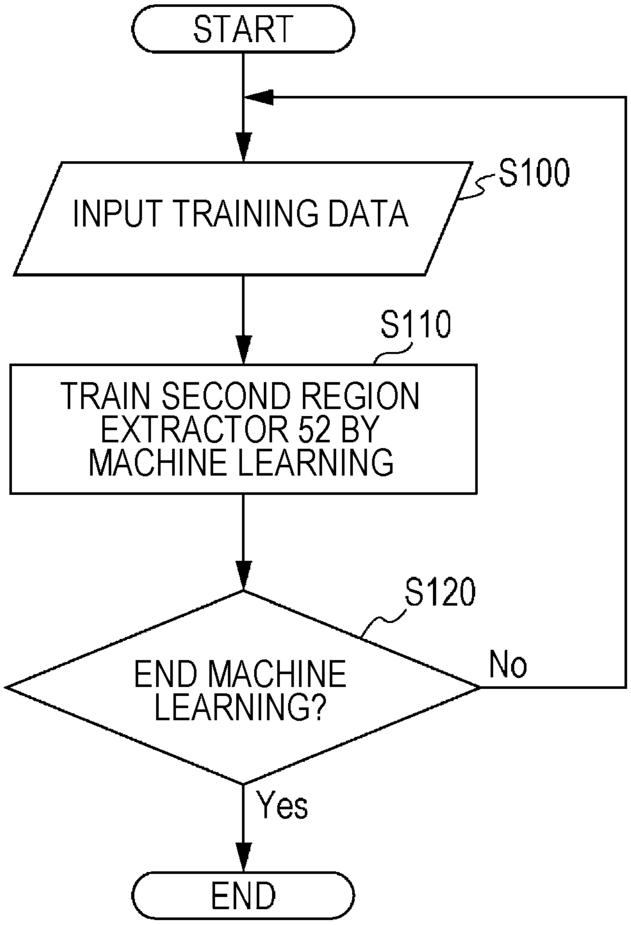
FIG. 13 is a flowchart illustrating a first embodiment of a machine learning method according to the present invention.

FIG. 13 is a flowchart illustrating a first embodiment of a machine learning method according to the present invention.

The processing in each step of the machine learning method of the first embodiment illustrated in FIG. 13 can be performed by the machine learning apparatus 50 illustrated in FIG. 7, for example.

In FIG. 13, the machine learning apparatus 50 (second processor 51) accepts the input of training data from the recording apparatus 6. For example, a single batch of training data is inputted (step S100).

The second processor 51 trains the second region extractor 52 on the basis of the inputted training data (step S110). In other words, the second processor 51 updates various parameters of the second region extractor 52 so as to reduce the difference between the output of the second region extractor 52 obtained when an image to be learned from the training data is inputted into the second region extractor 52, and the second ground-truth region mask treated as the ground-truth data. Note that if information pertaining the sample weighting has been added to the training data, the contribution of the training data to the machine learning preferably is modified according to the sample weighting.

Next, after training the second region extractor 52 with the single batch of training data, a determination is made regarding whether to end the machine learning (step S120). If it is determined not to end the machine learning (the "No" case), the flow proceeds to step S100, the next batch of training data is inputted, and the processing from step S100 to step S120 is repeated.

If it is determined to end the machine learning (the "Yes" case), the training of the second region extractor 52 ends, and the second region extractor 52 is treated as a trained region extractor.

Second Embodiment of Machine Learning Method

Figure 14:
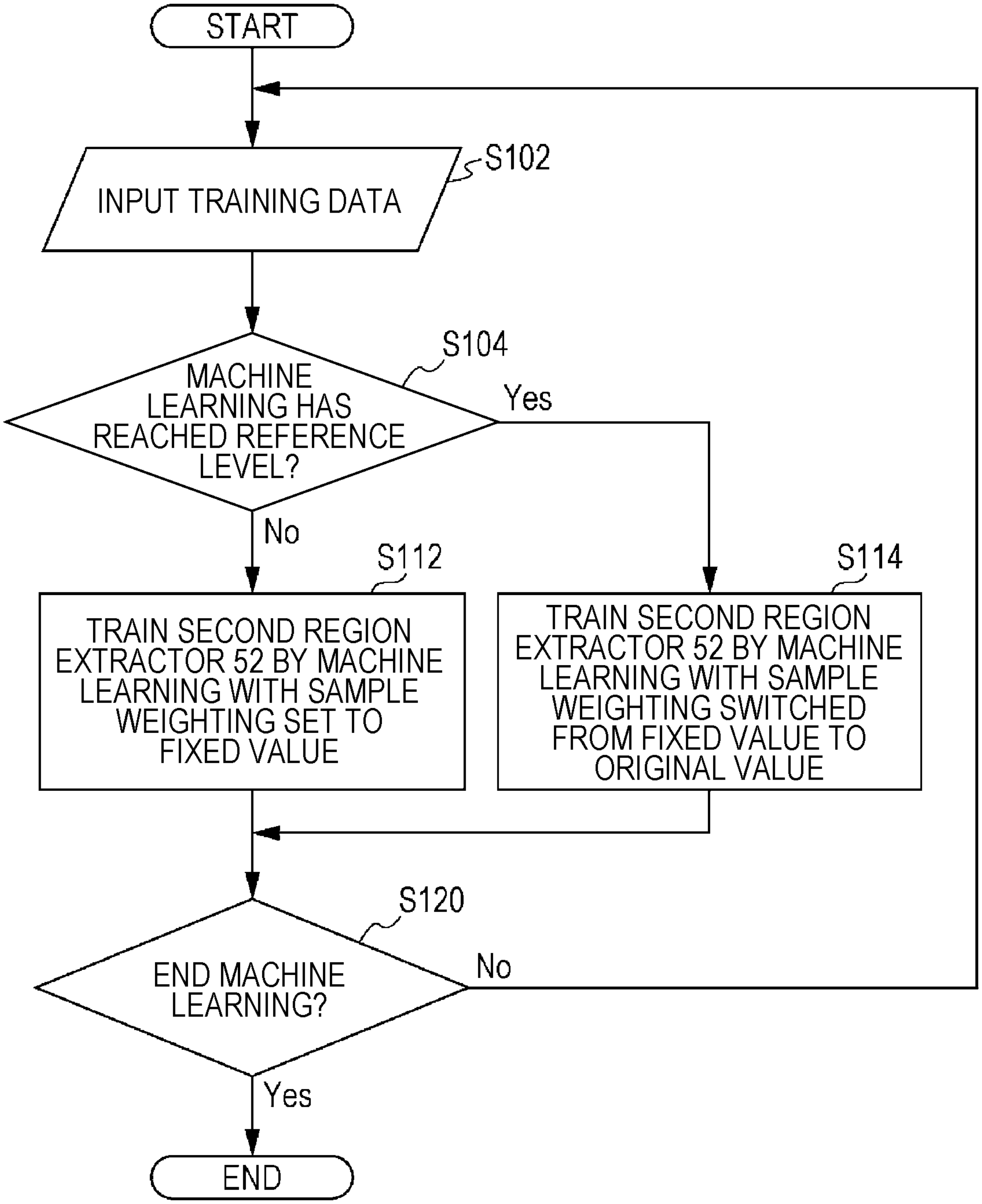
FIG. 14 is a flowchart illustrating a second embodiment of a machine learning method according to the present invention.

FIG. 14 is a flowchart illustrating a second embodiment of a machine learning method according to the present invention.

The processing in each step of the machine learning method of the second embodiment illustrated in FIG. 14 can be performed by the machine learning apparatus 50 illustrated in FIG. 7, similarly to the machine learning method of the first embodiment illustrated in FIG. 13. Note that in FIG. 14, portions in common with the machine learning method of the first embodiment illustrated in FIG. 13 are denoted with the same step numbers, and a detailed description of such portions is reduced or omitted.

In FIG. 14, the machine learning apparatus 50 (second processor 51) accepts the input of training data from the recording apparatus 6 (step S102). In the machine learning method of the second embodiment, training data containing not only the pair of a single image and a second ground-truth region mask but also a sample weighting is inputted.

The second processor 51 determines whether the machine learning of the second region extractor 52 using the training data has reached a reference level (step S104). For example, the learning level reached when the second region extractor 52 has been trained by machine learning using approximately 70% of the entirety of the training data can be set as the reference level. Note that the numerical value of 70% is merely one non-limiting example. The reference level may also be a value set, as appropriate, with respect to the accuracy (the difference between the output of the second region extractor 52 and the second ground-truth region mask) of region extraction by the second region extractor 52.

In step S104, if it is determined that the learning level has not reached the reference level (the "No" case), the second processor 51 trains the second region extractor 52 by machine learning with the sample weighting in the training data being set to a fixed value (step S112). For example, in the case in which the sample weighting is a value in the range from 0 to 1, the second region extractor 52 is trained by machine learning with the sample weighting set to a fixed value of "1", irrespectively of the training data.

Consequently, during initial training, machine learning of the second region extractor is performed with the sample weighting included in the training data being set to a fixed value, and thus the progress of the machine learning of the second region extractor 52 can be sped up.

On the other hand, in step S104, if it is determined that the learning level has reached the reference level (the "Yes" case), the second processor 51 trains the second region extractor 52 by machine learning with the sample weighting switched from the fixed value to the original value (step S114). In other words, by altering the contribution of each piece of training data to the machine learning in accordance with the sample weighting, the contribution to the machine learning can be lowered for training data having, for example, a second ground-truth region mask of low reliability, thereby further improving the accuracy of region extraction by the second region extractor 52.

Note that in the present example, machine learning is performed with the sample weighting being set to a fixed value until the learning level of the second region extractor 52 reaches the reference level, and if the learning level reaches the reference level, the sample weighting is switched from the fixed value to the original value. However, the configuration is not limited to the above, and the second region extractor may also be trained by machine learning such that the sample weighting is made to approach the original value from the fixed value, continuously or by stages, as the machine learning progresses from the initial training.

Other

The present invention encompasses a trained learning model configured as a convolutional neural network, namely the second region extractor 52 trained through machine learning by the machine learning apparatus 50, and also encompasses an image processing apparatus including the trained learning model.

Moreover, the hardware structure of a processing unit, such as a CPU for example, that executes various processing in a training data creation apparatus and a machine learning apparatus according to the present invention is any of various types of processors like the following. The various types of processors include: a central processing unit (CPU), which is a general-purpose processor that executes software (a program or programs) to function as any of various types of processing units; a programmable logic device (PLD) whose circuit configuration is modifiable after fabrication, such as a field-programmable gate array (FPGA); and a dedicated electric circuit, which is a processor including a circuit configuration designed for the specific purpose of executing a specific process, such as an application-specific integrated circuit (ASIC).

The first, second, and third processors or a single processing unit may be configured as any one of these various types of processors, but may also be configured as two or more processors of the same or different types (such as multiple FPGAs, or a combination of a CPU and an FPGA, for example). Moreover, a plurality of processing units may also be configured as a single processor. A first example of configuring a plurality of processing units as a single processor is a mode in which a single processor is configured as a combination of software and one or more CPUs, as typified by a computer such as a client or a server, such that the processor functions as the plurality of processing units. A second example of the above is a mode utilizing a processor in which the functions of an entire system, including the plurality of processing units, are achieved on a single integrated circuit (IC) chip, as typified by a system on a chip (SoC). In this way, various types of processing units are configured as a hardware structure by using one or more of the various types of processors indicated above.

More specifically, the hardware structure of these various types of processors is circuitry combining circuit elements such as semiconductor devices.

Also, the present invention encompasses a training data creation program that is installed in a computer to thereby cause the computer to achieve various functions as a training data creation apparatus according to the present invention, and also encompasses a recording medium storing the training data creation program.

Furthermore, the present invention is not limited to the foregoing embodiments, and obviously a variety of modifications are possible within a scope that does not depart from the spirit of the present invention.

REFERENCE SIGNS LIST

1-1, 1-2, 1-3, 1-4 training data creation apparatus
2, 3 database
4 training data
5 image database
6 recording apparatus
10-1, 10-2, 10-3 first processor
26 first region extractor
20, 21, 24 training sample acquisition unit
22, 23, 25 training sample
26A, 26B, 26C region extractor

30, 31 ground-truth region mask combination unit
32, 33 second ground-truth region mask
34, 35, 36 output unit
40, 41 sample weighting calculation unit
42, 43 sample weighting
50, 50-1 machine learning apparatus
51 second processor
52 second region extractor
52A input layer
52B intermediate layer
52C output layer
53 third processor
54 loss value calculation unit
56 parameter control unit
S10-S18, S100-S114 step

What is claimed is:

1. A training data creation apparatus comprising a first processor that creates training data for machine learning, wherein the first processor:

acquires, as a single training sample, a single image and a plurality of first ground-truth region masks for the single image;

generates a single second ground-truth region mask from the plurality of first ground-truth region masks;

outputs, as training data, a pair of the single image and the single second ground-truth region mask;

calculates a sample weighting such that the higher a degree of disagreement among the plurality of first ground-truth region masks is, the smaller the sample weighting of the training sample during machine learning is, and outputs, as training data, the pair of the single image and the single second ground-truth region mask together with the calculated sample weighting.

2. The training data creation apparatus according to claim 1, wherein the first processor acquires, as the plurality of first ground-truth region masks for the single image, ground-truth region masks each assigned to the single image by a plurality of evaluators.

3. The training data creation apparatus according to claim 1, wherein the first processor inputs the single image into each of a plurality of first region extractors trained by machine learning in advance using a ground-truth region mask of each of a plurality of evaluators, and acquires, as the plurality of first ground-truth region masks for the single image, a plurality of region extraction results outputted by the plurality of first region extractors.

4. The training data creation apparatus according to claim 1, wherein the sample weighting is a value in a range from 0 to 1, and the first processor calculates, as the sample weighting, a value obtained by subtracting a proportion of pixels in disagreement among the plurality of first ground-truth region masks from 1.

5. The training data creation apparatus according to claim 1, wherein the first processor further acquires diagnostic information for biological tissue, and generates the single second ground-truth region mask using the first ground-truth region masks matching the diagnostic information from among the plurality of first ground-truth region masks.

6. The training data creation apparatus according to claim 1, wherein the first processor acquires, as the single second ground-truth region mask, any of: a ground-truth region mask in which a ground-truth region is a region of a common portion of the plurality of first ground-truth region masks; a ground-truth region mask in which the ground-truth region is a region of a union of the plurality of first ground-truth region masks; a ground-truth region mask in which the ground-truth region is a region containing pixels determined to be the ground truth by a majority decision for each pixel in the plurality of first ground-truth region masks; a ground-truth region mask combined by averaging the plurality of first ground-truth region masks; and a first ground-truth region mask which is selected from the plurality of first ground-truth region masks and which has the ground-truth region of maximum or minimum area.

7. The training data creation apparatus according to claim 1, further comprising:

a recording apparatus storing a training data set containing a plurality of the training data.

8. The training data creation apparatus according to claim 1, wherein the single image is a medical image and the plurality of first ground-truth region masks are ground-truth region masks indicating a region of interest each assigned to the medical image by a plurality of evaluators.

9. A machine learning apparatus comprising:

a second processor and a second region extractor, wherein the second processor uses machine learning to train the second region extractor using the training data created by the training data creation apparatus according to claim 1.

10. The machine learning apparatus according to claim 9, wherein the second region extractor is a learning model configured as a convolutional neural network.

11. A trained learning model configured as the convolutional neural network, being the second region extractor trained by machine learning performed by the machine learning apparatus according to claim 10.

12. An image processing apparatus comprising the learning model according to claim 11.

13. A training data creation method for creating training data for machine learning by a first processor performing processing comprising:

a step of acquiring, as a single training sample, a single image and a plurality of first ground-truth region masks for the single image;

a step of generating a single second ground-truth region mask from the plurality of first ground-truth region masks;

a step of outputting, as training data, a pair of the single image and the single second ground-truth region mask;

a step of calculating a sample weighting such that the higher a degree of disagreement among the plurality of first ground-truth region masks is, the smaller the sample weighting of the training sample during machine learning is, wherein the pair of the single image and the single second ground-truth region mask together with the calculated sample weighting are outputted as training data.

14. The training data creation method according to claim 13, wherein the step of acquiring the training sample further comprises acquiring diagnostic information for biological tissue, and the step of generating the single second ground-truth region mask comprises generating the single second ground-truth region mask using the first ground-truth region masks matching the diagnostic information from among the plurality of first ground-truth region masks.

15. A machine learning method for training a second region extractor by a second processor using machine learning using the training data created according to the training data creation method according to claim 13.

16. A machine learning method for training a second region extractor by a second processor using machine learning using the training data created according to the training data creation method according to claim 13, wherein during initial training, the machine learning of the second region extractor is performed with the sample weighting included in the training data being a fixed value, and as the machine learning progresses and the sample weighting approaches an original value from the fixed value, or when the machine learning reaches a reference level, the machine learning of the second region extractor is performed with the sample weighting switched from the fixed value to the original value.

17. A non-transitory, computer-readable tangible recording medium which records thereon a training data creation program for causing, when read by a computer, the computer to achieve:

a function of acquiring, as a single training sample, a single image and a plurality of first ground-truth region masks for the single image;

a function of generating a single second ground-truth region mask from the plurality of first ground-truth region masks;

a function of outputting, as training data, a pair of the single image and the single second ground-truth region mask;

a function of calculating a sample weighting such that the higher a degree of disagreement among the plurality of first ground-truth region masks is, the smaller the sample weighting of the training sample during machine learning is, and a function of outputting, as training data, the pair of the single image and the single second ground-truth region mask together with the calculated sample weighting.

* * * * *